(12) United States Patent
Stanley

(10) Patent No.: US 7,490,853 B2
(45) Date of Patent: Feb. 17, 2009

(54) SYSTEM FOR DETECTING AN EMPTY VEHICLE SEAT

(75) Inventor: James G. Stanley, Novi, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 11/498,811

(22) Filed: Aug. 4, 2006

(65) Prior Publication Data

US 2007/0030473 A1 Feb. 8, 2007

Related U.S. Application Data

(60) Provisional application No. 60/705,465, filed on Aug. 5, 2005.

(51) Int. Cl.
*B60R 21/16* (2006.01)

(52) U.S. Cl. ........................... 280/735; 180/273

(58) Field of Classification Search ................. 280/735; 180/273, 271; 701/45; 297/217.3
See application file for complete search history.

(56) References Cited

U.S. PATENT DOCUMENTS 6,088,642 A * 7/2000 Finkelstein et al. ........... 701/49

7,029,031 B2 * 4/2006 Moisel et al. ............... 280/735
7,050,897 B2 * 5/2006 Breed et al. .................... 701/46
2004/0215382 A1 10/2004 Breed et al.

FOREIGN PATENT DOCUMENTS

| DE | 1005008457 A1 * | 8/2006 |
| EP | 1 356 999 A2 | 10/2003 |
| WO | WO 2004/045914 A | 6/2004 |

OTHER PUBLICATIONS

RD 406008A, Jan. 1998.*

* cited by examiner

*Primary Examiner*—Faye M. Fleming
(74) *Attorney, Agent, or Firm*—Foley & Lardner LLP

(57) ABSTRACT

A system for detecting an empty vehicle seat includes an emitter mounted in the vehicle seat and a sensor for detecting changes in radiation produced by the emitter, wherein the changes in radiation may indicate whether an object is in the vehicle seat. A heater may be mounted in the vehicle seat. A sensor, positioned above the vehicle seat, may detect changes in the surface temperature of the vehicle seat. The changes in surface temperature may indicate whether an object is in the vehicle seat. A light source may be mounted in the vehicle seat. A sensor, positioned above the vehicle seat, detects changes in the light produced by the light source. The changes in the produced light indicate whether an object is in the vehicle seat.

4 Claims, 5 Drawing Sheets

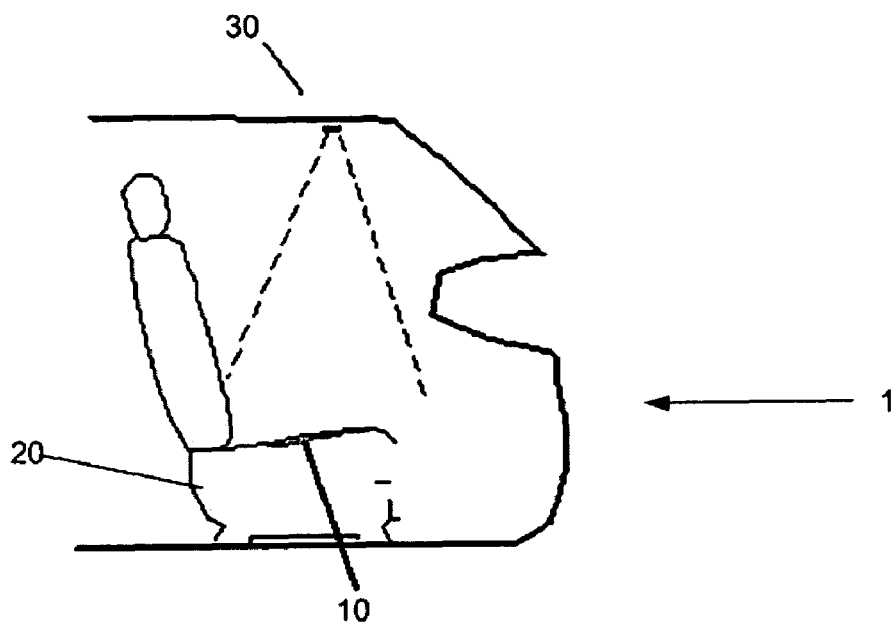
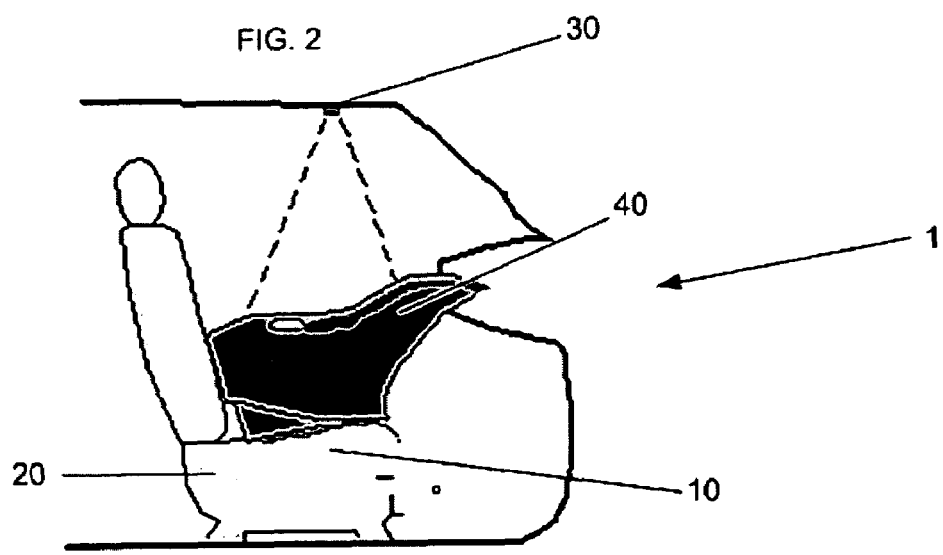

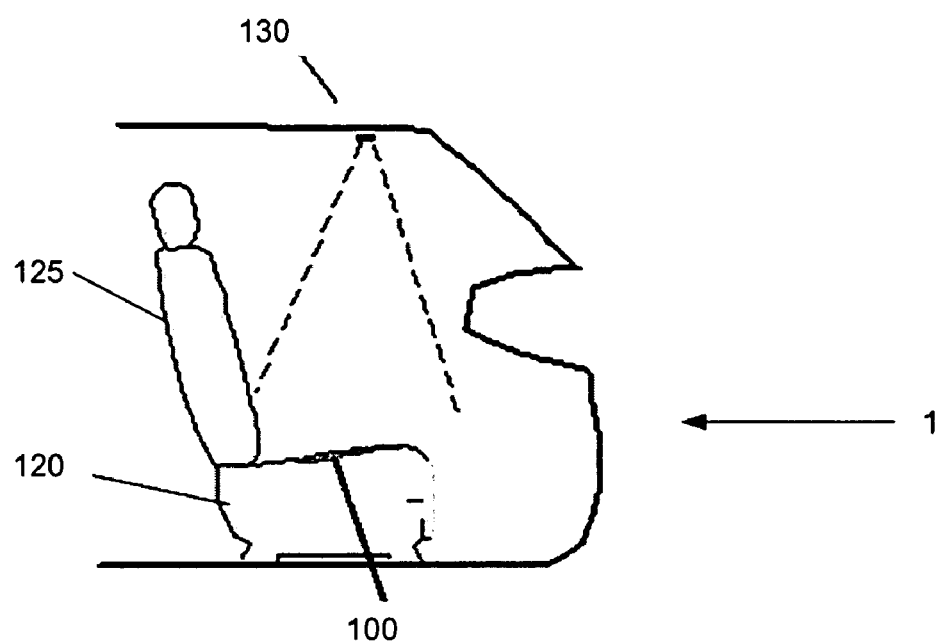

SYSTEM FOR DETECTING AN EMPTY VEHICLE SEAT

CROSS-REFERENCE TO RELATED PATENT APPLICATIONS

This application claims priority to and benefit of U.S. Provisional Application No. 60/705,465, filed Aug. 5, 2005, the disclosure of which is incorporated herein by reference in its entirety.

BACKGROUND

The present invention relates generally to the field of occupant detection. Specifically, the present invention is directed to a system and method of identifying whether a passenger seat is empty, or whether an object or occupant is in the seat. The occupant, for example, could be a person seated directly on the seat or a child in a child seat.

There are many existing systems that employ sensors to detect and classify an occupant located in a passenger seat of a vehicle. Weight sensors, vision sensors, pressure sensors, capacitive sensors are examples of some devices that may be used in occupant detection systems.

The general objective of the classification systems described above, is to determine whether there is an occupant present in a vehicle seat. In turn, information collected by the sensors may be used by a vehicle safety restraint system to determine whether to activate certain devices to protect actual vehicle occupants. Alternatively, the information collected by the sensors could be used to warn occupants that their seat belt is not buckled. In addition, the system described above could be used to identify occupant presence in the front passenger positions or in the passenger positions in seating rows rear of the driver.

Generally, conventional systems do not produce consistent results. These systems have difficulty consistently identifying and accurately monitoring empty seat conditions. For example, typical systems have difficulty discerning an empty seat from a seat that is occupied by a child seat.

Measurement based on the vertical force applied on a vehicle seat may also produce inconsistent results because an occupied child seat may cause the pressure distribution and total force on the seat to be very low. As a result, it may be difficult to discern whether an occupant is present in the vehicle seat (e.g., a 10 pound child in an 8 pound child seat spread across much of the seat bottom).

Thus, a more sensitive system for detecting the presence of an object or occupant in a vehicle seat is needed.

SUMMARY OF THE INVENTION

According to one embodiment of the invention, a system for detecting an empty vehicle seat includes an emitter mounted in the vehicle seat, a sensor for detecting changes in radiation produced by the emitter and a controller configured to receive an input from the sensor and to determine whether an object is in the vehicle seat.

According to another embodiment of the invention, the emitter is configured to emit electromagnetic radiation. The emitter may be mounted in a seat bottom of the vehicle seat or in a seat back of the vehicle seat.

According to yet another embodiment of the invention, the sensor is configured to monitor at least a seat bottom of a vehicle seat. Alternatively, the sensor is configured to monitor a seat bottom and seat back of a vehicle seat. The sensor may be positioned on an A-pillar or B-pillar inside the vehicle. Alternatively, the sensor is positioned on the instrument panel located inside the vehicle or on the ceiling of the vehicle.

According to still another embodiment of the invention, the sensor monitors changes in radiation on the vehicle seat when the emitter is turned on. The sensor is configured to measure the intensity of the electromagnetic radiation produced by the emitter.

According to one embodiment of the invention, a system for detecting an empty vehicle seat includes a heater mounted in the vehicle seat, a sensor, positioned above the vehicle seat, for detecting changes in the surface temperature of the vehicle seat and a controller configured to receive an input from the sensor and to determine whether an object is in the vehicle seat.

According to another embodiment of the invention, the heater is mounted in a seat bottom of the vehicle seat. Alternatively, the heater is mounted in a seat back of the vehicle seat.

According to yet another embodiment of the invention, the sensor is an infrared sensor configured to measure the intensity of infrared electromagnetic waves produced by the heater to determine the surface temperature of the vehicle seat. The sensor monitors changes in the surface temperature of the vehicle seat when the heater is turned on.

According to still another embodiment of the invention, a system for detecting an empty vehicle seat includes a light source mounted in a vehicle seat, a sensor, positioned above the vehicle seat, for detecting the light produced by the light source and a controller configured to receive an input from the sensor and to determine whether an object is in the vehicle seat.

According to one embodiment of the invention, the light source is mounted in a seat back of the vehicle seat and the sensor is positioned such that the light from the source is incident upon the sensor. Alternatively, the light source is mounted in a seat bottom of the vehicle seat or on the surface of the seat bottom of the vehicle seat.

The sensor monitors the light on the vehicle seat when the light source is turned on and is configured to measure the intensity of light produced by the light source.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 1 is a profile view of a system for detecting an empty vehicle seat according to one embodiment of the invention.

FIG. 2 is a profile view of a system for detecting an empty vehicle seat according to another embodiment of the invention.

FIG. 7 is a profile view of a system for detecting an empty vehicle seat according to another embodiment of the invention.

DETAILED DESCRIPTION

Embodiments of the present invention will be described below with reference to the accompanying drawings. It should be understood that the following description is intended to describe exemplary embodiments of the invention, and not to limit the invention.

FIG. 1 shows a system for detecting an empty vehicle seat 1 according to one embodiment of the invention. An emitter 10 is positioned in the vehicle seat 20. A sensor 30 is disposed inside the vehicle and is configured to monitor the output of the emitter 10.

As shown in FIG. 1, the emitter 10 is positioned in the seat bottom of the vehicle seat 20. Alternatively, the emitter 10 may be positioned in the seat back of the vehicle seat 20. According to one embodiment of the invention, the emitter 10 may be positioned on the surface of the seat bottom or the surface of the seat back of the vehicle seat 20. The sensor 30 may also be positioned at numerous locations. For example, the sensor 30 may be positioned in the vehicle instrument panel, on the vehicle pillars, or on the vehicle ceiling in order to monitor emissions from an emitter mounted in the seat back.

The emitter 10 is a device that is capable of producing and emitting electromagnetic radiation that may be detected by a sensor 30. The emitter 10 may generate electromagnetic radiation at a constant rate or the emitter 10 may generate radiation in pulses. Further, the electromagnetic radiation generated by the emitter 10 has properties such that the electromagnetic radiation is greatly attenuated when an object is in its path. The emitter 10 may generate electromagnetic radiation undetectable to the human eye such as, for example, infrared waves. Alternatively, the electromagnetic radiation may be visible light or ultra violet light.

According to one embodiment of the invention, the emitter 10 is a heater for heating the vehicle seat 20. When operational, the heater generates infrared waves that may be detected by the sensor 30.

According to still another embodiment of the invention, the emitter 10 is a light source configured to produce light that may be detected by the sensor 30. Accordingly, if enough light is generated under the cover of the vehicle seat 20, some of the light will penetrate the seat cover and may be detected from above the vehicle seat 20. In certain embodiments, the light source may be located under the seat foam of the seat bottom or the seat back.

In a situation where the seat cover attenuates the emitted light by a large amount, it is possible to put the emitter 10 (light source) in a location in the vehicle seat 20 where there is a seam between sections of the vehicle seat 20 such that the light passes through the vehicle seat 20. Alternatively, according to one embodiment of the invention, the vehicle seat 20 includes an area comprising a material configured to allow at least a detectable amount of visible light to pass through the surface of the vehicle seat 20.

Figure 3:
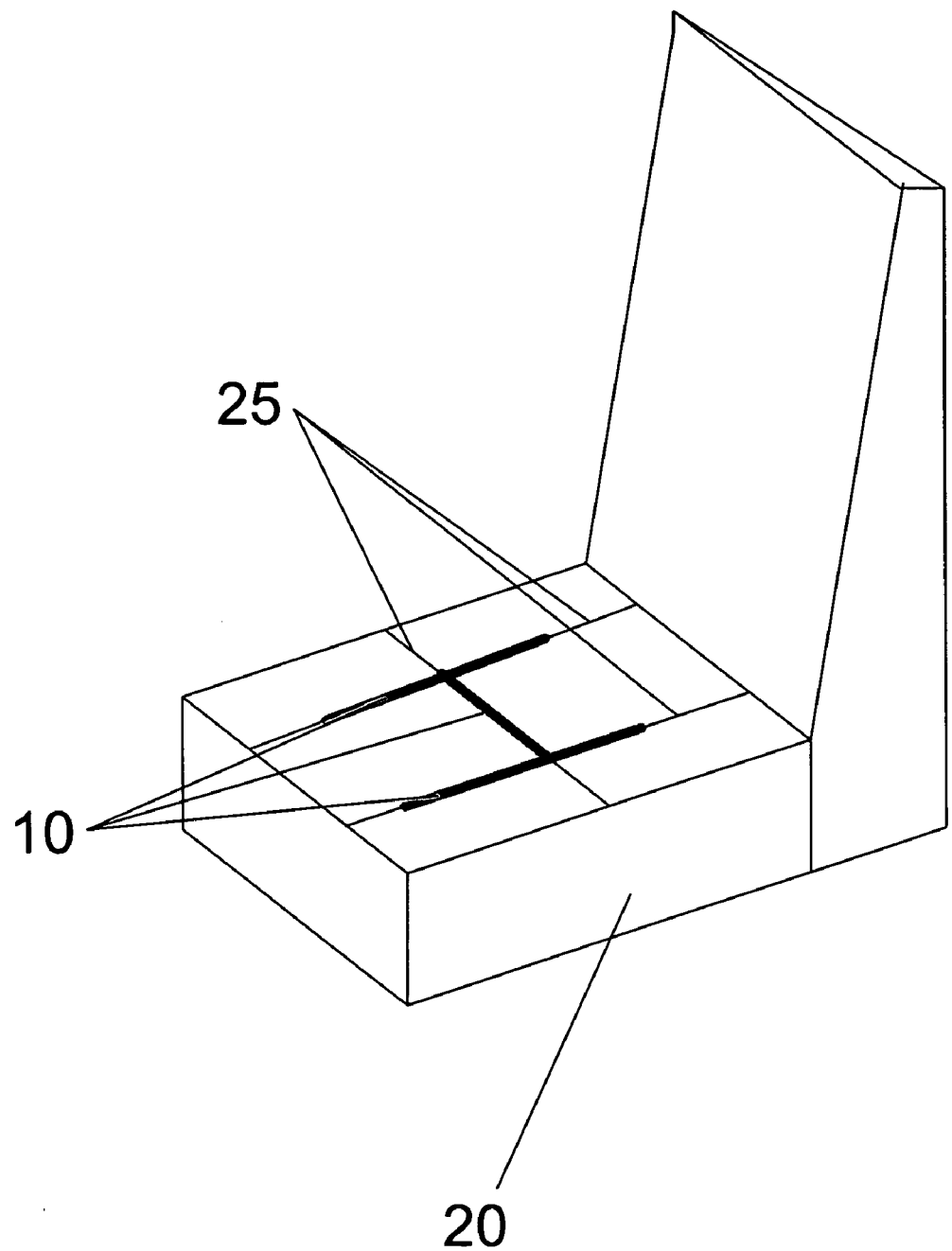
FIG. 3 is a perspective view of a emitter mounted in a vehicle seat according to another embodiment of the invention.
Figure 4:
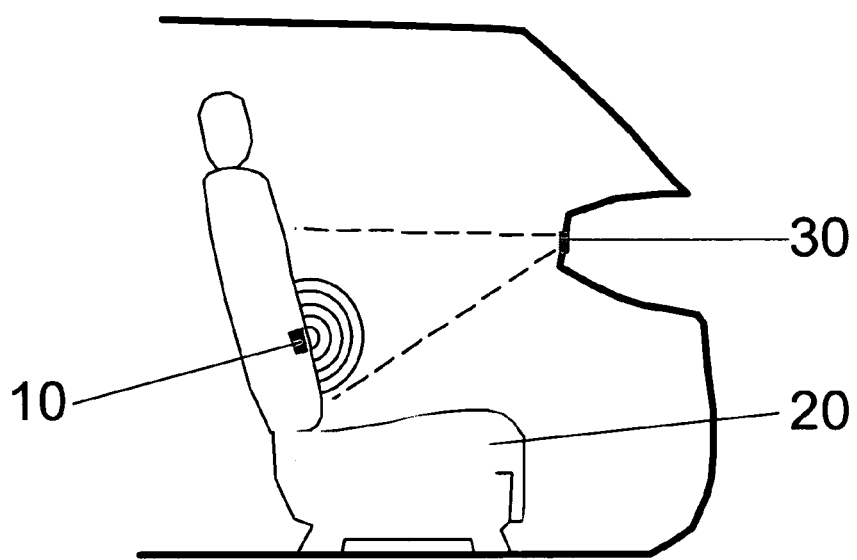
FIG. 4 is a profile view of a system for detecting an empty vehicle seat according to one embodiment of the invention.
Figure 5:
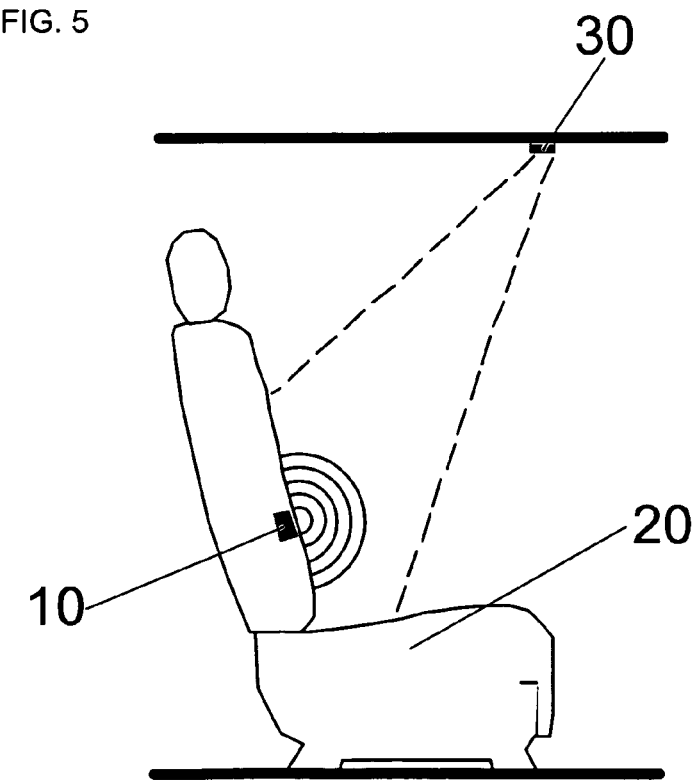
FIG. 5 is a profile view of a system for detecting an empty vehicle seat according to one embodiment of the invention.

According to another embodiment of the invention, fiber optics are woven into the seat cover. When light is emitted down the fiber, some light escapes the fiber (by design of the fiber and the fiber's bend radius) and is visible from above the vehicle seat 20. Alternatively, as shown in FIG. 3, an emitter 10 (light source) may be placed in line with the "trench" 25 of the seat foam. The "trench" 25 is where the seat cover is held to the seat foam. Trenches 25 may be positioned on the bottom of the seat or the seat back.

As shown in FIGS. 1 and 2, the sensor 30 may be positioned above the vehicle seat 20. The sensor 30 detects the intensity and fluctuations of the electromagnetic radiation produced by the emitter 10. According to one embodiment of the present invention, the sensor 30 is configured to monitor an area encompassing the majority of the seat bottom of the vehicle seat 20. Thus, as shown in FIG. 1, the scanning area of the sensor 30 is large enough to monitor the seat bottom of the vehicle seat 20 in the full range of positions that the vehicle seat 20 may assume. According to another embodiment of the invention, the sensor 30 is configured to monitor the seat back of the vehicle seat 20 in addition to the vehicle seat bottom.

The sensor 30 may be positioned at any suitable location in the vehicle. The sensor 30 should be positioned facing the emitter 10 in a location where the sensor's scanning area is not obstructed by other vehicle components. According to one embodiment of the invention, the sensor 30 is positioned on an A-pillar inside the vehicle. According to another embodiment of the invention, the sensor 30 is positioned on an instrument panel located inside the vehicle. According to still another embodiment of the invention, the sensor 30 is positioned on the ceiling of the vehicle.

According to another embodiment of the invention, the system is used to identify occupant presence in the rear seats, wherein a single sensor 30 is used to monitor the emitters 10 in multiple seating locations. The sensor 30 could be mounted on the pillars, on the ceiling, or on any other location where there is no obstruction in the vehicle between the emitter 10 and sensor 30.

The operation of an exemplary system, will now be described with reference to FIGS. 2-6.

Figure 6:
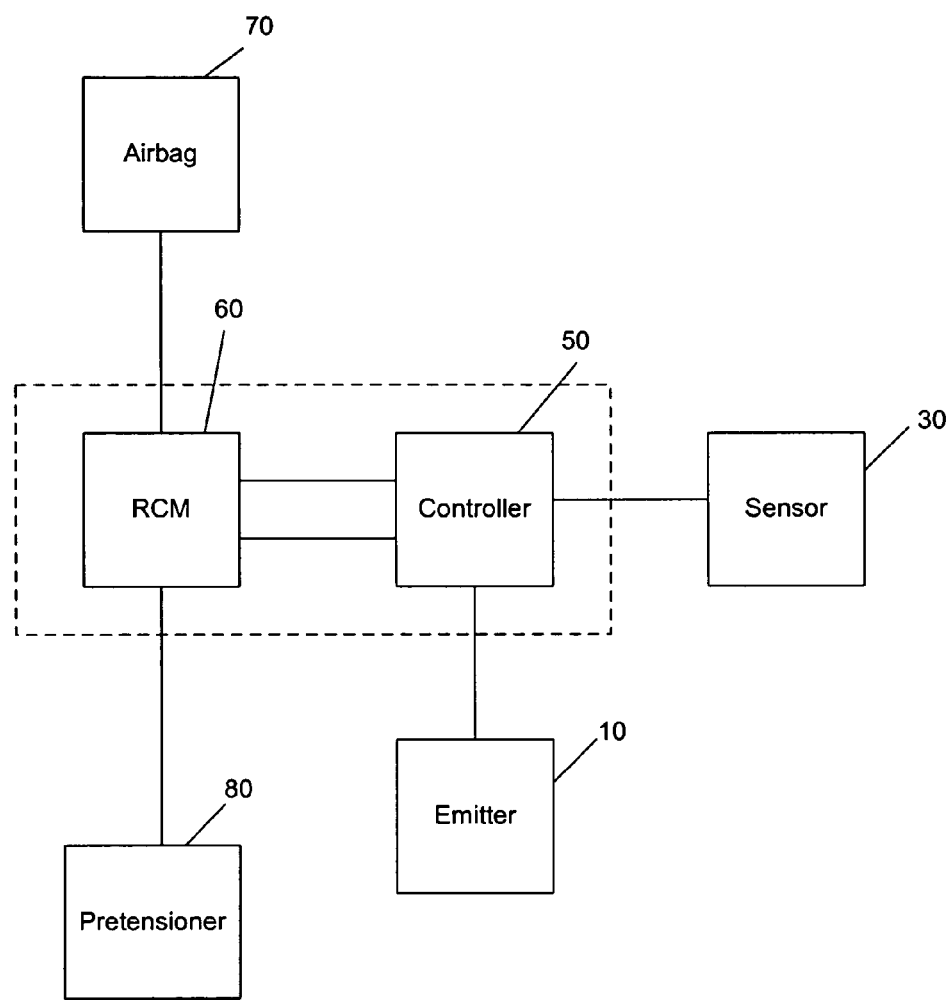
FIG. 6 is a block diagram of a safety restraint system including a system for detecting an empty vehicle seat according to one embodiment of the invention.

FIG. 6 is a block diagram of a safety restraint system including a system for detecting an empty vehicle seat. A controller 50 is provided. The controller is operably connected to the sensor 30 and emitter 10. The controller 50 operates the emitter 10 and receives information in the form of signals from the sensor 30. The controller 50 is also connected to a restraint control module (RCM) 60. The RCM 60 is operably connected to an airbag 70 and a pretensioner 80. The RCM 60 is configured to control the operation of the airbag 70 and pretensioner 80. Specifically, the RCM 60 may determine whether the airbag 70 and pretensioner 80 can be activated based on the signals received by the controller 50 from the sensor 30. According to one embodiment of the invention, the controller 50 may also function as the RCM 60.

During operation, the controller 50 controls the heater 10 in the seat bottom and monitors changes in the vehicle seat's 20 temperature when the heater 10 is turned on. Specifically, the sensor 30 is configured to detect changes in the intensity of electromagnetic radiation emitted from the seat region. The output from the sensor 30 can be used by the controller 50 to calculate or derive an increase or decrease in temperature of the vehicle seat 20.

The emitter 10 is a heater, and when the vehicle seat 20 is completely empty, the sensor 30 will detect a change in temperature of the seating surface when the heater 10 is operating. In contrast, when a significant object is positioned on the seating surface, the sensor 30 will only be able to monitor, view and/or detect characteristics of the surface of the object. When the sensor 30 is configured to monitor temperature change, the sensor may be configured so that the sensor 30 will not detect a drastic temperature change even though the heater 10 is operating. A detection of a minor or insignificant change in temperature when the heater 10 is turned on indicates to the system 1 that an object is present on the vehicle seat 20.

For example, according to one embodiment of the invention and as shown in FIG. 2, if there is a child seat 40 on the vehicle seat 20, the sensor 30 will measure the temperature on the surface of the child seat 40 facing the sensor 30. Typically, while the seat bottom is warming up, the temperature at the surface of the child seat 40 facing the sensor 30 will not change significantly. The failure of the sensor to detect a change in temperature indicates that an object may be present on the vehicle seat 20. If, on the other hand, the sensor 30 detects a change in the seat surface temperature when the seat heater 10 is operating, then an empty seat is indicated.

The sensor 30 may also measure the temperature when the heater 10 is not operating. An empty seat will usually cool after the seat heater is turned off and the sensor 30 will detect a temperature reduction. According to one embodiment of the invention, the controller 50 may monitor numerous heating or cooling cycles in order to confirm the occupant's presence.

According to another embodiment of the invention and as shown in FIG. 7, fluorescent material 100 is placed on the seat bottom 20 or the seat back 125. A light source is positioned above the seat and is configured to cause the seat bottom 120 or seat back 125 to fluoresce when turned on. The light source may have a wavelength corresponding to infra red light, ultra violet light or visible light. Similarly, the fluorescent material may fluoresce at a wavelength corresponding to infra red light, ultra violet light or visible light. The sensor 130, mounted above the vehicle seat 120, is configured to detect light being emitted from the fluorescent material 100 to determine whether the vehicle seat is empty.

According to certain aspects of the invention, several advantages may be realized. According to one embodiment of the invention, a seat heater in the seat bottom (or seat back) is a source of radiation that may be used to identify whether there is an occupant in the vehicle seat 20. The system is very effective for the occupant classification categories which are the most difficult to detect such as light child seats. Other conventional systems may use the heat from the occupant to identify when the seat is occupied, but these conventional systems are prone to erroneous readings when the occupants are wearing thick clothing, or when there is a child seat that is covered with a blanket. In addition, for existing IR systems, the contrast for passive IR imaging sensors is reduced when the ambient temperature is between 30 degrees Celsius and 40 degrees Celsius. An important advantage of the system disclosed herein is that the system uses a change in electromagnetic radiation being emitted from the seat surface as an indicator of whether the seat is empty. Thus, in the disclosed system the temperature and weight of the occupant are not significant factors in occupant detection.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A system for detecting an empty vehicle seat, comprising:
   a heater mounted in the vehicle seat;
   a sensor, positioned above the vehicle seat, for detecting changes in the surface temperature of the vehicle seat; and
   a controller configured to receive an input from the sensor and to determine whether an object is in the vehicle seat based on the changes in the surface temperature of the seat vehicle.

2. A system for detecting an empty vehicle seat as claimed in claim 1, wherein the heater is mounted in a seat bottom of the vehicle seat.

3. A system for detecting an empty vehicle seat as claimed in claim 1, wherein the heater is mounted in a seat back of the vehicle seat.

4. A system for detecting an empty vehicle seat as claimed in claim 1, wherein the sensor is an infrared sensor configured to measure the intensity of infrared electromagnetic waves produced by the heater to determine the surface temperature of the vehicle seat.

* * * * *